(12) United States Patent  (10) Patent No.: US 9,358,480 B2
Cordua  (45) Date of Patent: Jun. 7, 2016

(54) WATER FILTER SYSTEM (71) Applicant: Paul M. Cordua, Lindsay, CA (US)

(72) Inventor: Paul M. Cordua, Lindsay, CA (US)

( * ) Notice: Subject to any disclaimer, the term of this patent is extended or adjusted under 35 U.S.C. 154(b) by 601 days.

(21) Appl. No.: 13/629,275

(22) Filed: Sep. 27, 2012

(65) Prior Publication Data

US 2013/0081984 A1 Apr. 4, 2013

Related U.S. Application Data (60) Provisional application No. 61/543,219, filed on Oct. 4, 2011.

(51) Int. Cl.
*B01D 24/00* (2006.01)
*C02F 1/00* (2006.01)
*B01D 24/46* (2006.01)
*B01D 35/30* (2006.01)
*B01D 24/14* (2006.01)

(52) U.S. Cl.
CPC ............ *B01D 24/007* (2013.01); *B01D 24/002* (2013.01); *B01D 24/14* (2013.01); *B01D 24/4642* (2013.01); *B01D 35/303* (2013.01); *C02F 1/00* (2013.01); *C02F 1/004* (2013.01); *C02F 2201/007* (2013.01); *C02F 2209/05* (2013.01); *C02F 2303/16* (2013.01)

(58) Field of Classification Search
None
See application file for complete search history.

(56) References Cited

U.S. PATENT DOCUMENTS

| | | | |
|---|---|---|---|
| 1,184,024 A | 11/1876 | Stewart | |
| 431,229 A * | 7/1890 | Jewell | 210/264 |
| 2,454,340 A | 6/1891 | Fulton | |
| 597,222 A * | 1/1898 | Rhood | 210/278 |
| 2,315,223 A * | 3/1943 | Riche | 210/92 |
| 2,723,761 A | 11/1955 | Van Der Made et al. | |
| 3,202,286 A | 8/1965 | Smit | |
| 3,278,031 A | 10/1966 | Rosaen | |
| 3,381,823 A * | 5/1968 | Nash | 210/279 |
| 3,625,365 A * | 12/1971 | Armstrong et al. | 210/232 |
| 4,139,473 A | 2/1979 | Alldredge et al. | |
| 4,246,119 A | 1/1981 | Alldredge et al. | |
| 4,308,141 A | 12/1981 | Clendenen et al. | |
| 4,627,923 A * | 12/1986 | Ross | 210/744 |
| 5,294,337 A | 3/1994 | Johnson | |
| 7,399,419 B2 | 7/2008 | Barbaro et al. | |

* cited by examiner

*Primary Examiner* — Terry Cecil
(74) *Attorney, Agent, or Firm* — Fulwider Patton LLP (57) ABSTRACT A modular water filter system includes a plurality of media filter tank modules including an underdrain disposed within the filter tank module at the bottom side of the filter tank module, a controller, and a plurality of back flush valves associated with corresponding ones of the plurality of media filter tank modules, respectively.

18 Claims, 11 Drawing Sheets

WATER FILTER SYSTEM

CROSS-REFERENCES TO RELATED APPLICATIONS

This application is based upon and claims priority from Provisional Application No. 61/543,219, filed Oct. 4, 2011, which is incorporated in its entirety herein.

BACKGROUND OF THE INVENTION

The present invention relates generally to water filtration equipment, and more particularly relates to a modular water filtration system.

Water filtration can help prevent blockage and potential wear in water sprinkler systems, valve systems and drip systems due to the presence of small particulates in water, such as sand, algae or other organic material, or the like. Typically two or more 3 to 10 foot diameter rounded tanks of media filters, also known as sand filters, are used by farms and municipal water systems to clean water of such material from rivers and lakes by forcing the water through a container filled with small particulate matter, preferably small, sharp edged, particulate filter material such as a uniformly sized, crushed sand, or a variety of different types and sizes of particulate materials. Such media filters are cleaned by back flushing, typically through an under drain. The force of the water going backwards through the filter lifts and separates the media, which frees the debris and washes it out through a flush valve. However, for a typical tank system, back flushing of one tank can require over 50% of the water flow, which can lower the water pressure of the system, causing slow action of the back flush valve, so that in some cases an expensive pressure sustaining valve must be used, which wastes water and causes longer flush times to achieve a maximum cleaning of the filter. During back flushing, in order to loosen the particulate filter material and suspend each particle of filter material in order to release the filterable impurities trapped in the particulate filter material, it is commonly necessary to use back flush flow rates greater than filtration flow rates, which can require a separate pump for back flushing, or introduction of air in the back flush liquid to lift the particulate filter material.

One conventional type of media filter is known that includes self-graded coarse-to-fine granular filter media for up-flow filtration, down-flow filtration, or filtration by combined up and down flow to a central exit. A down-flow media filter typically includes a perforated diaphragm or plate under the particulate filter material, while an up-flow filter typically includes perforated diaphragms or plates under and over the particulate filter material, allowing liquid to pass through the perforations, while preventing loss of the filter media. Down-flow filters typically include a tank containing a particulate filter material such as sand, with an inlet receiving pressurized water and an outlet for the filtered water. Following back flushing, the particulate filter material settles with the largest, fastest settling particles of filter material at the bottom and the finest, slowest settling particles of filter material at the top. During filtration, smaller filterable impurities in the liquid are filtered out by the smaller particles of filter material at the top of the filter, with very little of the filterable impurities being filtered by the larger particles of filter material at the bottom of the filter, and the remaining solids in the liquid build up on the top of the filter. Up-flow filters can be more practical and efficient than down-flow filters, because as the liquid to be filtered is pumped into the filter material from the bottom, larger filterable impurities are trapped in the coarser layer of filter material at the bottom, and smaller filterable impurities are trapped in the finer layers of filter material. The filterable impurities are more evenly distributed throughout the particulate filter material and the pressure drop is more evenly distributed across the particulate filter material, so that flow rates can be much higher than in a down-flow filter for the same pressure drop. However, the filtration rate of up-flow filters is commonly limited by the necessity of providing an upper perforated diaphragm or plate for holding the particulate filter material in place.

One conventional filter system is known that includes a set of modules, each including screen assemblies and filter media sandwiched between the screen assemblies, and multiple control assemblies, with each control assembly being provided to control flow through the corresponding module. A given module is bypassed when the given module becomes occluded, and the occluded module is back flushed by providing a reverse flow through the screen assemblies and the filter media. Another conventional filter system is known that includes a modular water filtration and back flush assembly, with a reservoir sectioned into an upper supply chamber and a lower drain chamber by modular, horizontally co-planar filter cells. A carriage assembly is selectively positioned over an individual cell and a back flush hood is lowered to isolate the modular cell. Water is pumped upwardly out of the hood to expand and flush the filter media, with jetwash probes and a baffle plate being used. Each cell is sequentially backwashed on a continuous basis, allowing uninterrupted operation of the other filtration modules.

It would be desirable to provide a water filter system including a plurality of media filter tank modules controlled by a single controller, and a back flush system requiring flushing of only one of the plurality of filter tank modules at a time to minimize pressure loss in the system flow, and not requiring pressure sustaining valves, to allow quick and efficient back flushing, with a minimum amount of back flush water. It would also be desirable to provide a modular water filter system with "union" type connections that can be hand tightened for easy installation and removal, and that can be disassembled quickly for rapid and easy servicing. It would also be desirable to provide a modular water filter system having dimensions similar to existing steel and stainless steel tank media filter systems, to allow the replacement of existing media filter systems by the modular water filter system of the invention. It would also be desirable to provide a light weight, modular water filter system that allows design and construction of a system for the exact gallons per minute required, and that allows for addition of filter tank modules to increase capacity, as needed. The present invention meets these and other needs.

SUMMARY OF THE INVENTION

Briefly and in general terms, the present invention provides for a modular water filter system including a plurality of media filter tank modules including an underdrain disposed within the filter tank module at the bottom side of the filter tank module, a controller, and a plurality of back flush valves associated with corresponding ones of the plurality of media filter tank modules, respectively.

The present invention accordingly provides for a modular water filter system, including one or more fluid supply flow conduits, one or more fluid outlet conduits, one or more fluid flush outlet conduits, and a plurality of media filter tank modules connected in fluid communication with the one or more fluid supply flow conduits, the one or more fluid outlet conduits, and the one or more fluid flush outlet conduits. Each of the media filter tank modules has a top side and a bottom side, a top connector opening, and an underdrain disposed within the filter tank module at the bottom side of the filter tank module.

Each of the media filter tank modules also is configured to contain a particulate filter material. In a presently preferred aspect, the particulate filter material is sand, such as a coarse or fine mesh sand, for example. In another presently preferred aspect, a media fill port is provided on the top of the filter tank module for filling the filter module with particulate filter material, and a media drain port is provided on the bottom of the filter tank module for draining and replacing the particulate filter material.

In another presently preferred aspect, each underdrain includes an underdrain tee connector having one or more inlet flow ports, an outlet flow port connected in fluid communication with the one or more inlet flow ports, and a plurality of fluid flow directing segments each including an upwardly directed opening connected in fluid communication with the one or more inlet flow ports, so that the underdrain back flushes vertically on the upper side only, as will be explained further below. During back flushing, no flow is directed in any direction other than straight up, so that the particulate filter material is lifted evenly, allowing for an efficient back flush with a minimum amount of flow.

The modular water filter system also includes a controller that is configured to generate a plurality of coded signals for each of the plurality of back flush valves, respectively, each of the plurality of coded signals indicating one of first and second valve positions of the plurality of back flush valves. In a presently preferred aspect, each of the plurality of back flush valves can be operated manually or automatically by the controller. In another presently preferred aspect, the controller is a two wire back flush controller.

The modular water filter system also includes a plurality of back flush valves associated with corresponding ones of the plurality of media filter tank modules, respectively. Each of the plurality of back flush valves includes an inlet port connected in fluid communication with the one or more fluid supply flow conduits, an outlet port connected in fluid communication with the one or more fluid outlet conduits, and a flush port connected in fluid communication with the one or more fluid flush outlet conduits. Each of the plurality of back flush valves is mounted to a corresponding top connector opening of one of the plurality of media filter tank modules, and each of the plurality of back flush valves is movable between a first valve position and a second valve position, the plurality of back flush valves permitting normal filtering flow through the media filter tank modules in the first position, and causing back flushing of the media filter tank modules in the second valve position.

Each of the plurality of back flush valves associated with the plurality of media filter tank modules includes a receiver connected in electrical communication with the controller, and a corresponding solenoid switch electrically connected with the receiver, respectively. Each receiver is configured to receive the coded signal from the controller to operate the associated solenoid switch operatively connected to the one or more of the plurality of back flush valves. Each corresponding solenoid switch is configured to move the corresponding one of the plurality of back flush valves between the first valve position and the second valve position responsive to the coded signals from the controller. Typically up to three tanks can be operated from one back flush solenoid switch.

These and other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Referring to the drawings, which are provided by way of example, and not by way of limitation, the present invention provides for a modular water filter system 20 including one or more fluid supply flow conduits 22, one or more fluid outlet conduits 24, and one or more fluid flush outlet conduits 26. The modular water filter system preferably includes a plurality of media filter tank modules 28, a plurality of back flush valves 30 associated with a corresponding one of the plurality of media filter tank modules, respectively, and a controller 32 electrically connected in communication with the plurality of back flush valves and configured to operate the plurality of back flush valves. Each of the plurality of media filter tank modules has a top side 34 and a bottom side 36, and is configured to contain a particulate filter material (not shown). Each media filter tank module having a top connector opening 40, and each of the plurality of back flush valves associated with a corresponding one of the plurality of media filter tank modules is mounted to a corresponding top connector opening of one of the plurality of media filter tank modules.

Figure 1:
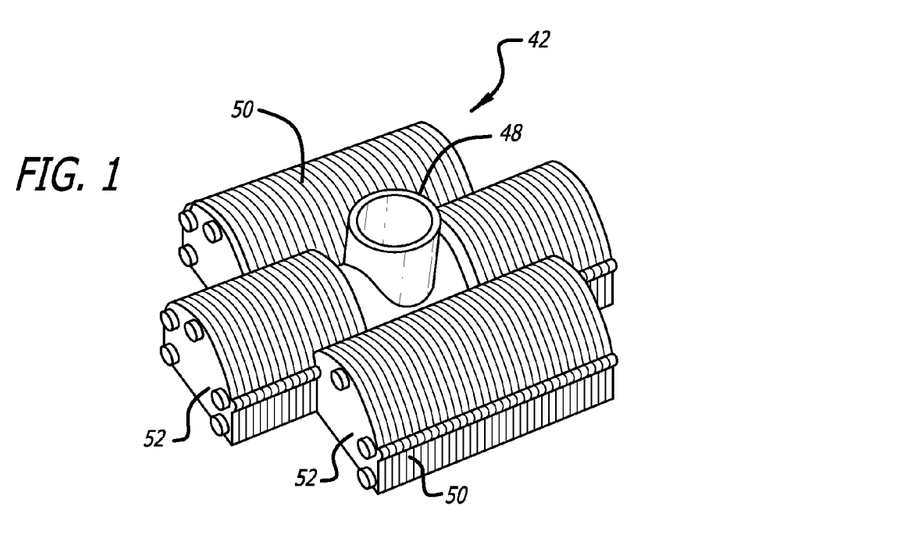
FIG. 1 is a perspective view of an underdrain of the water filter system of the present invention.
Figure 14:
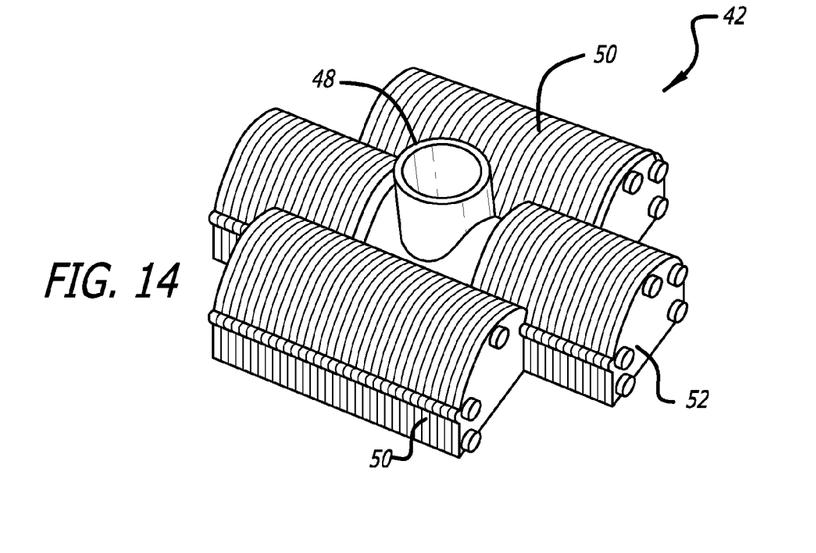
FIG. 14 is a perspective view of an underdrain of the water filter system of the present invention.
Figure 15:
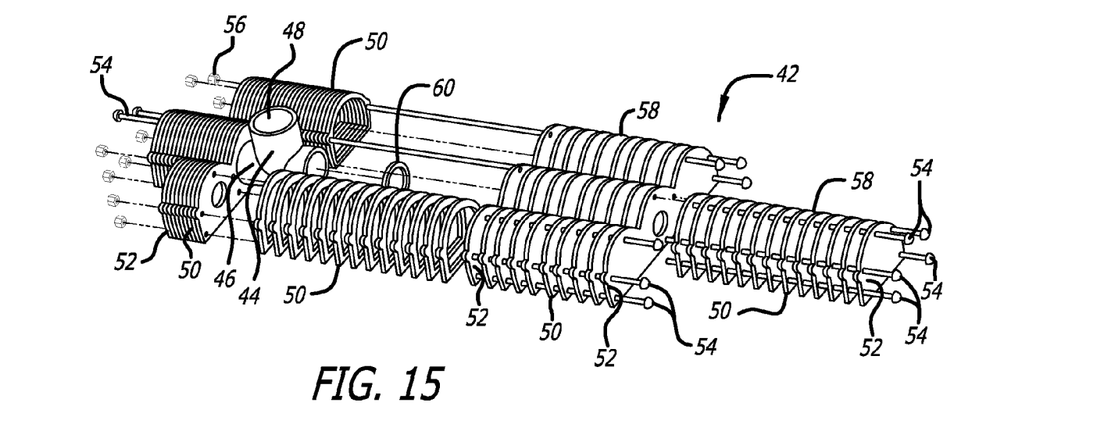
FIG. 15 is an exploded view of the underdrain of FIG. 14.

As is illustrated in FIGS. 1, 14, 15, each media filter tank module includes an underdrain 42 disposed within the filter tank module at the bottom side of the filter tank module and typically covering about 90% of the bottom of the filter. Each underdrain including an underdrain tee connector 44 having one or more inlet flow ports 46, an outlet flow port 48 connected in fluid communication with the one or more inlet flow ports, and a plurality of fluid flow directing segments 50 and separator segments 52 connected together with fasteners, such as bolts 54 and nuts 56. Each of the plurality of fluid flow directing segments including an upwardly directed opening 58 connected in fluid communication with the one or more inlet flow ports, typically with an underdrain O-ring 60 providing a seal between the plurality of fluid flow directing segments and the inlet flow ports. Normal filtering flow is downward through the particulate filter material and through the upwardly directed opening of the fluid flow directing segments, and the underdrain back flushes in the reverse fluid flow direction, vertically upwardly on the upper side only. During back flushing, no flow is directed in any direction other than straight up, lifting the filter media evenly, allowing for the most efficient back flush with a minimum amount of flow available to the market today. Each media filter tank module is capable of flowing between 15 and 25 gallons per minute. The particulate filter material is preferably sand, such as coarse or fine mesh sand, or layers or gradations of coarse or fine mesh sand, for example, although other types of particulate filter material may also be suitable.

Figure 11:
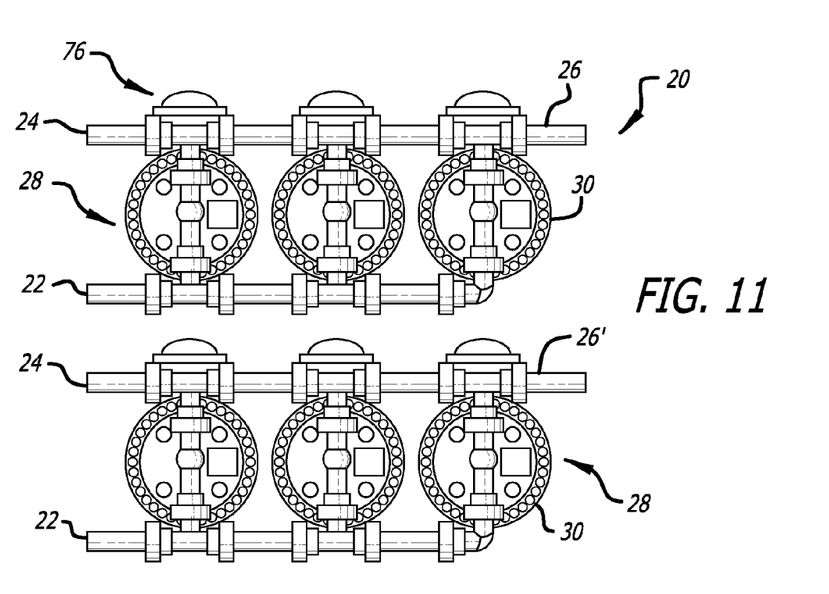
FIG. 11 is a schematic diagram of a top plan view of a portion of a typical 48 tank configuration of the water filter system of the present invention, illustrating spacing between media filter modules.
Figure 12:
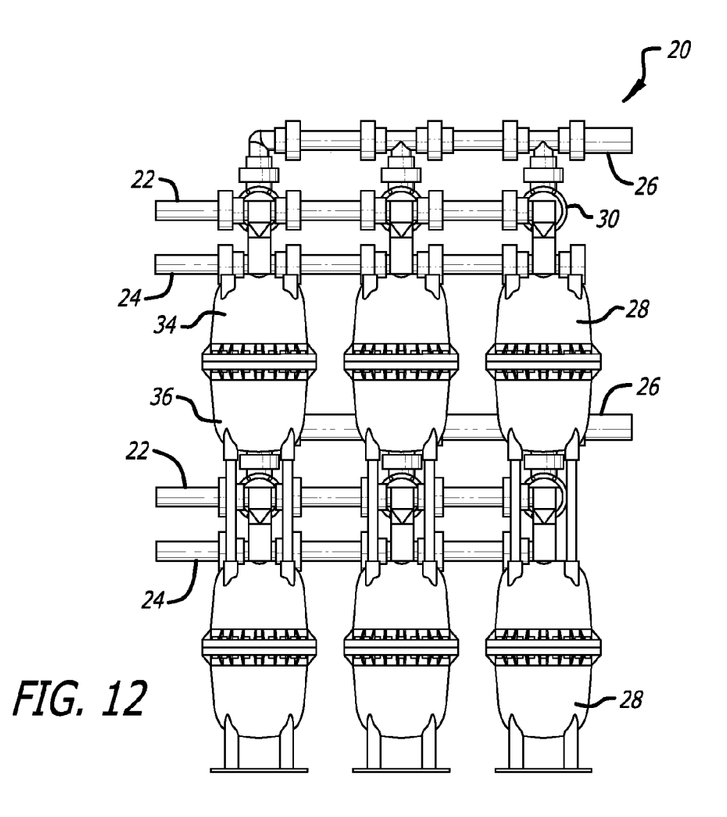
FIG. 12 is a schematic diagram of an elevational view of a portion of a typical 48 tank configuration of the water filter system of the present invention, illustrating spacing between media filter modules.
Figure 13:
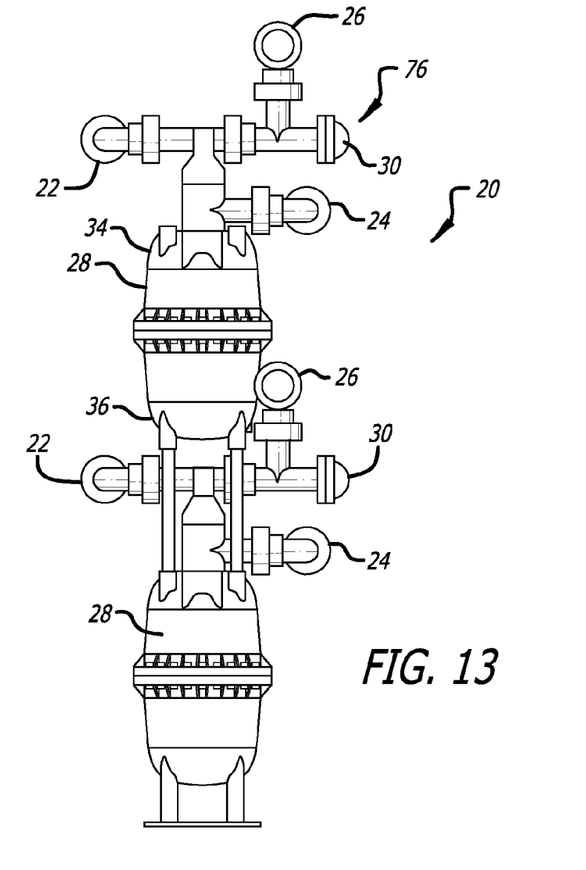
FIG. 13 is a schematic diagram of another elevational view of a portion of a typical 48 tank configuration of the water filter system of the present invention, illustrating spacing between media filter modules.

Each media filter tank module preferably has a housing or tank portion, typically formed of glass filled nylon, for example. Each media filter tank module typically holds up to about 5 gallons of particulate filter material. A media fill port (not shown) is provided on the top of the filter tank module for filling the filter module with particulate filter material, and a media drain port (not shown) is provided on the bottom of the filter tank module for draining and replacing the particulate filter material. Referring to FIG. 11, adjacent rows of the media filter tank modules are typically spaced apart at least about thirty inches to permit removal and replacement of back flush valves for maintenance of the system.

Figure 2:
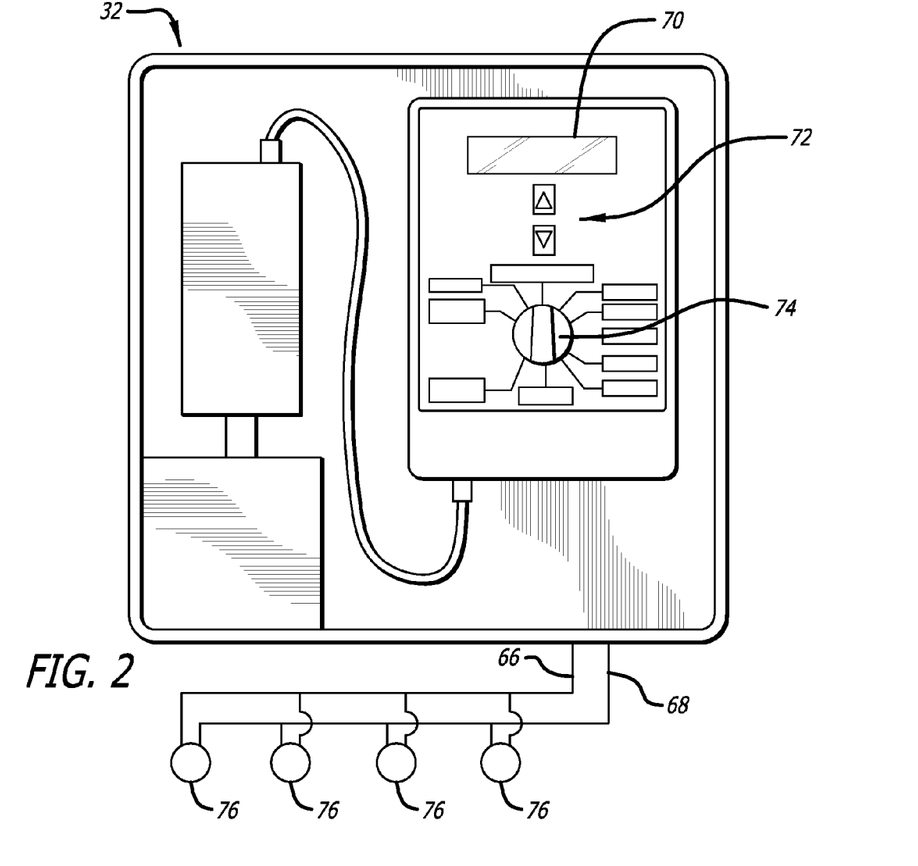
FIG. 2 is a schematic diagram of a controller of the water filter system of the present invention.
Figure 3:
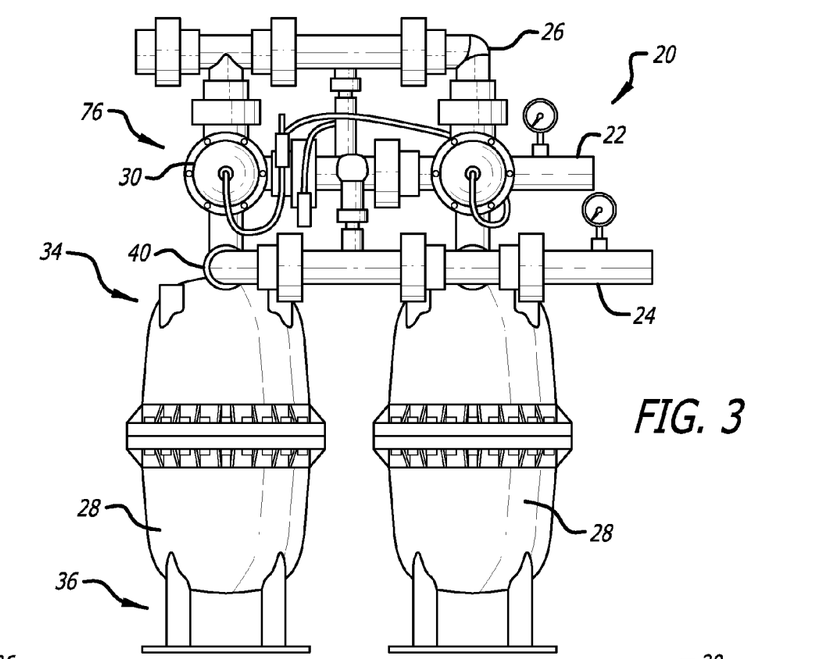
FIG. 3 is a schematic diagram of a two tank horizontal configuration of the water filter system of the present invention.
Figure 4:
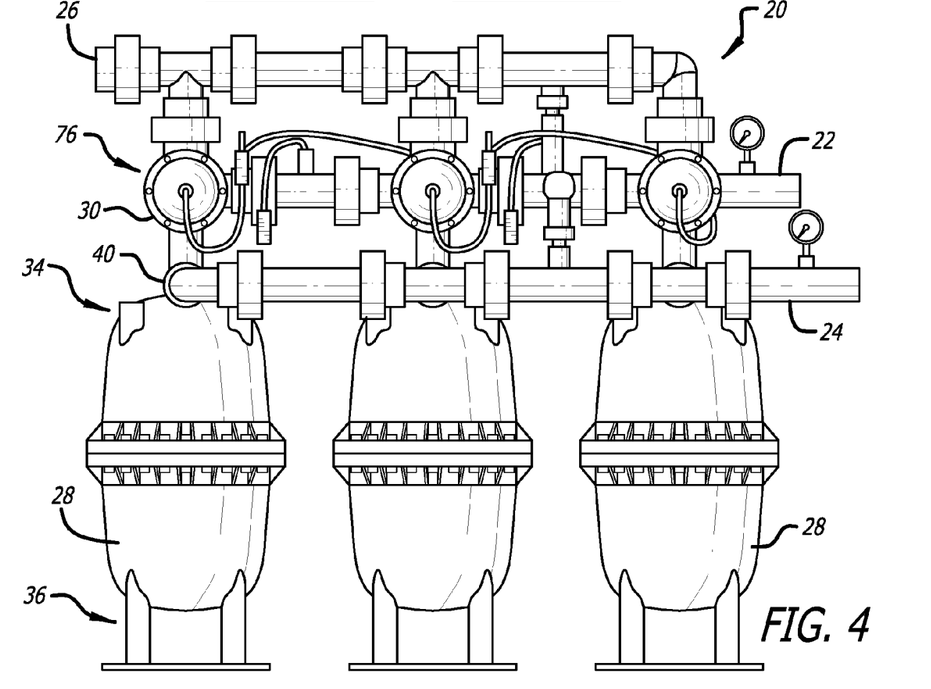
FIG. 4 is a schematic diagram of a three tank horizontal configuration of the water filter system of the present invention.
Figure 5:
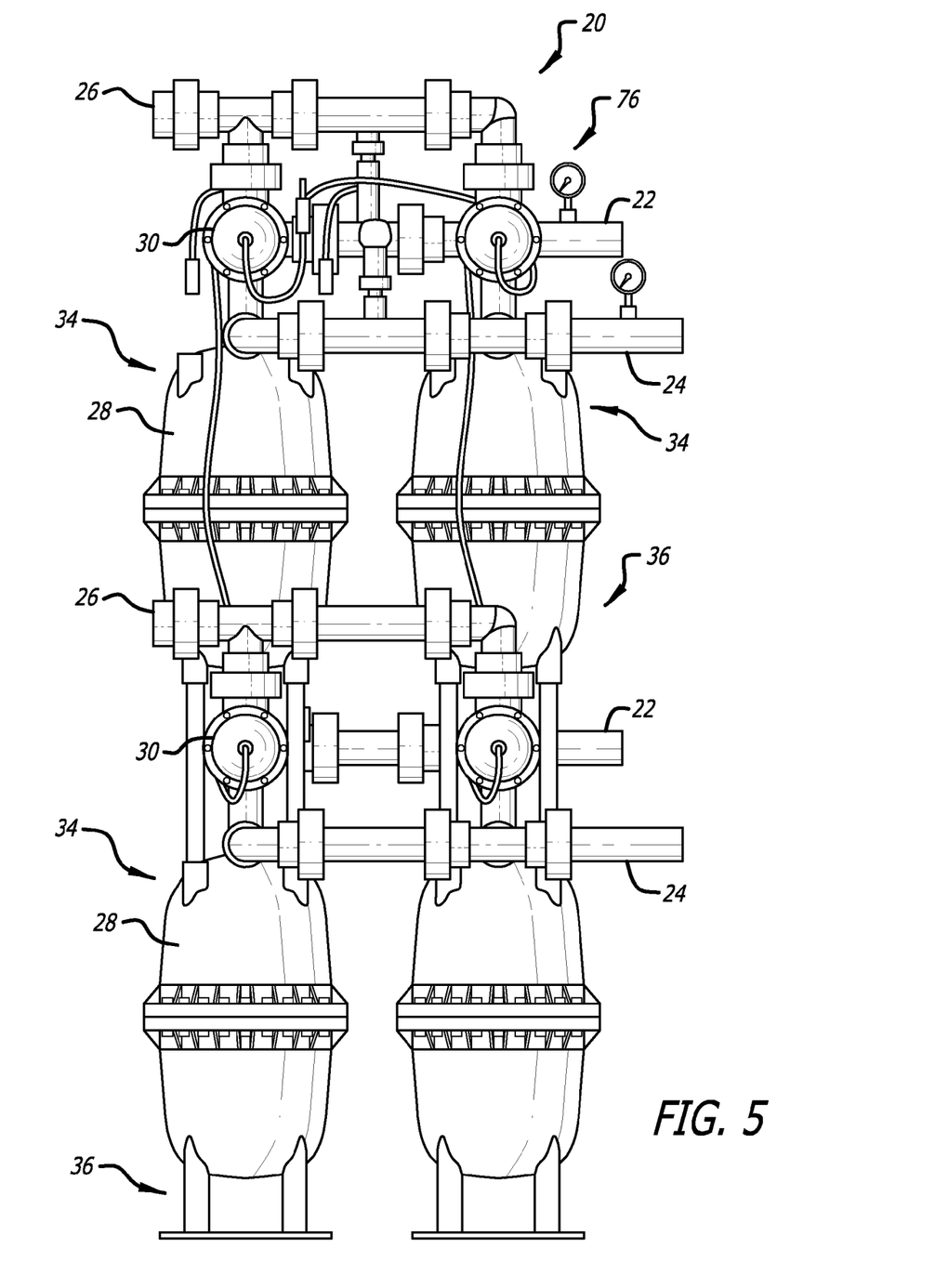
FIG. 5 is a schematic diagram of a four tank horizontal stacked configuration of the water filter system of the present invention.
Figure 6:
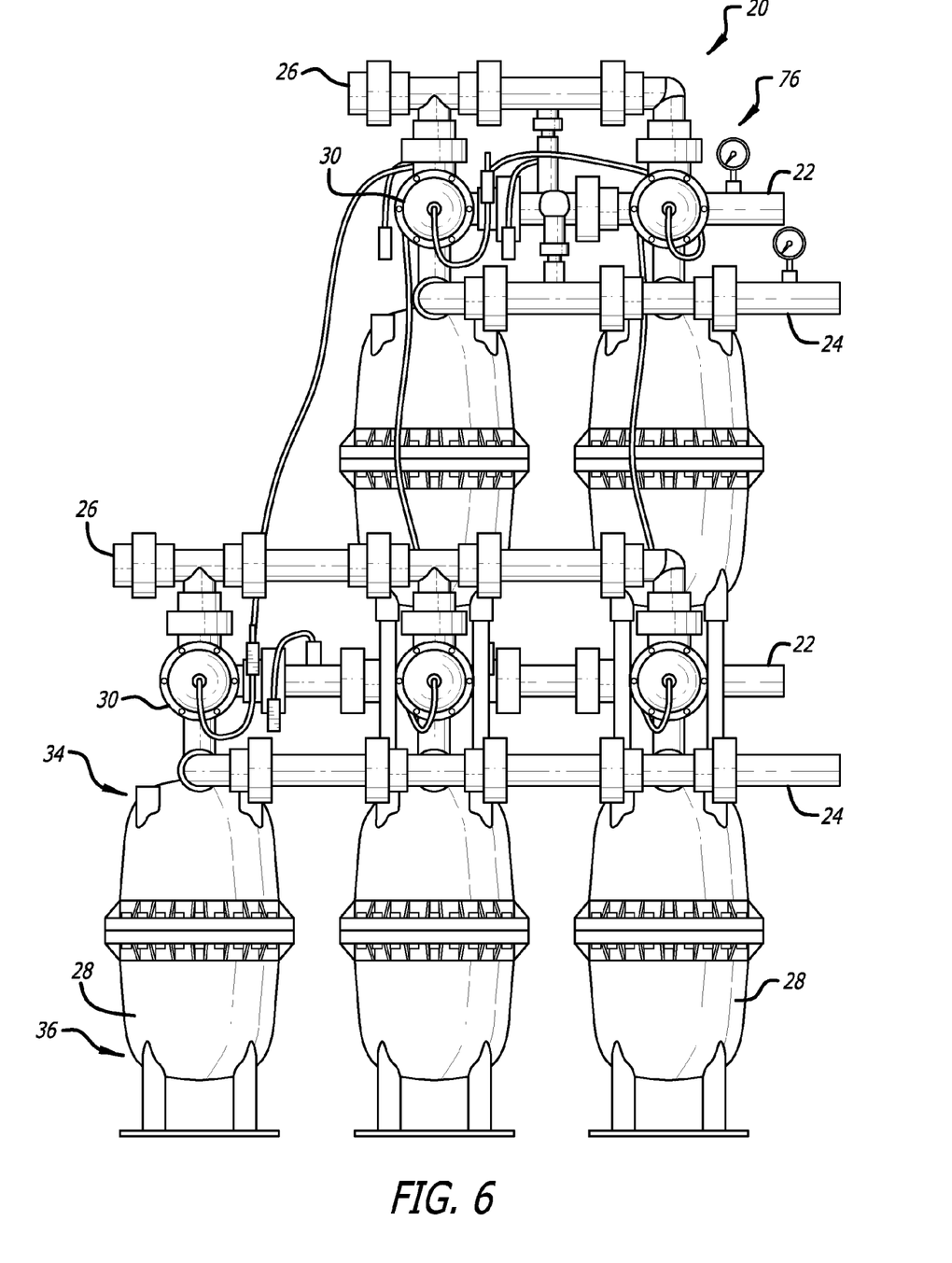
FIG. 6 is a schematic diagram of a five tank horizontal stacked configuration of the water filter system of the present invention.
Figure 7:
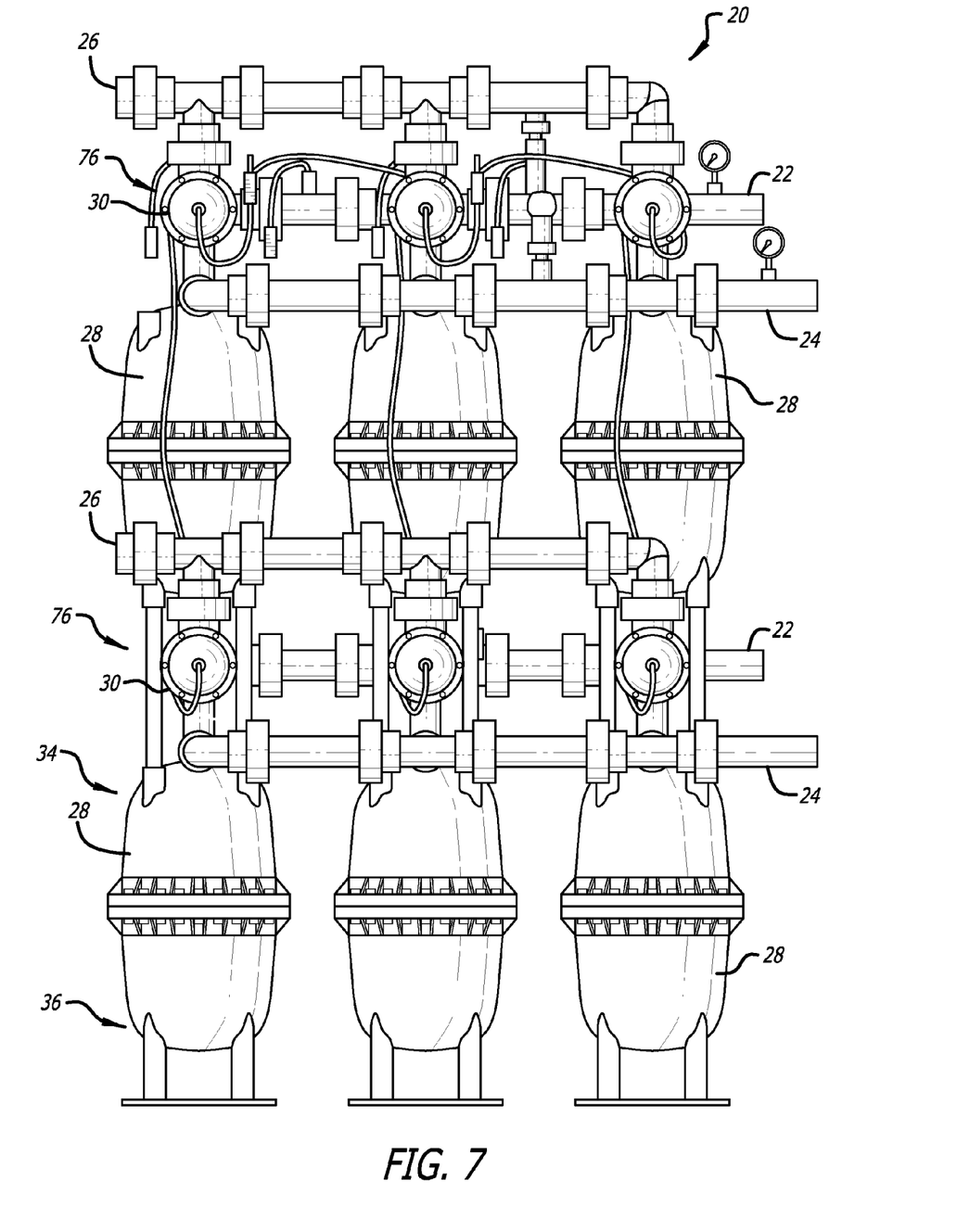
FIG. 7 is a schematic diagram of a six tank horizontal stacked configuration of the water filter system of the present invention.
Figure 8:
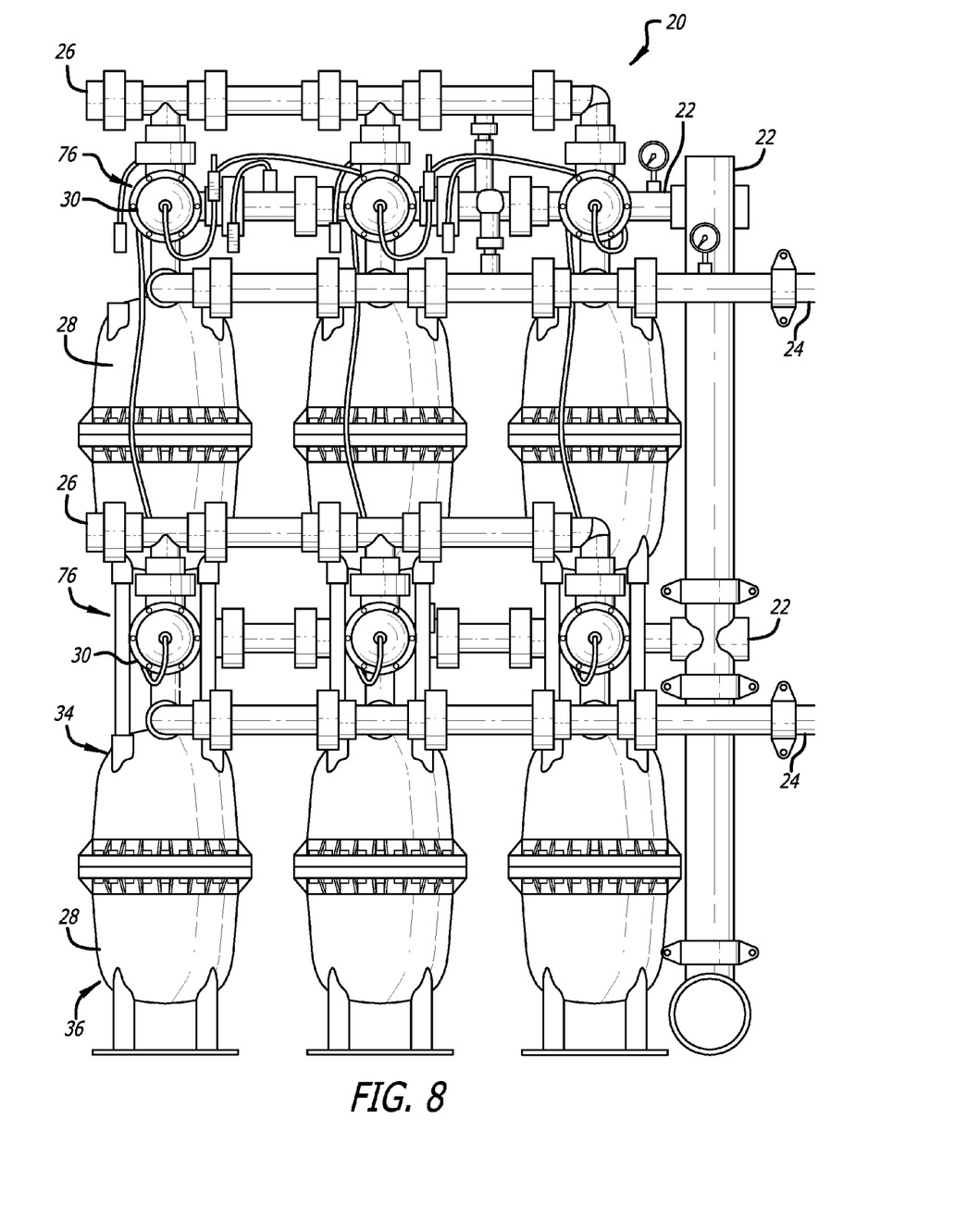
FIG. 8 is a schematic diagram of another six tank horizontal stacked unit configuration of the water filter system of the present invention that can be assembled with one or more other six tank horizontal stacked units.
Figure 9:
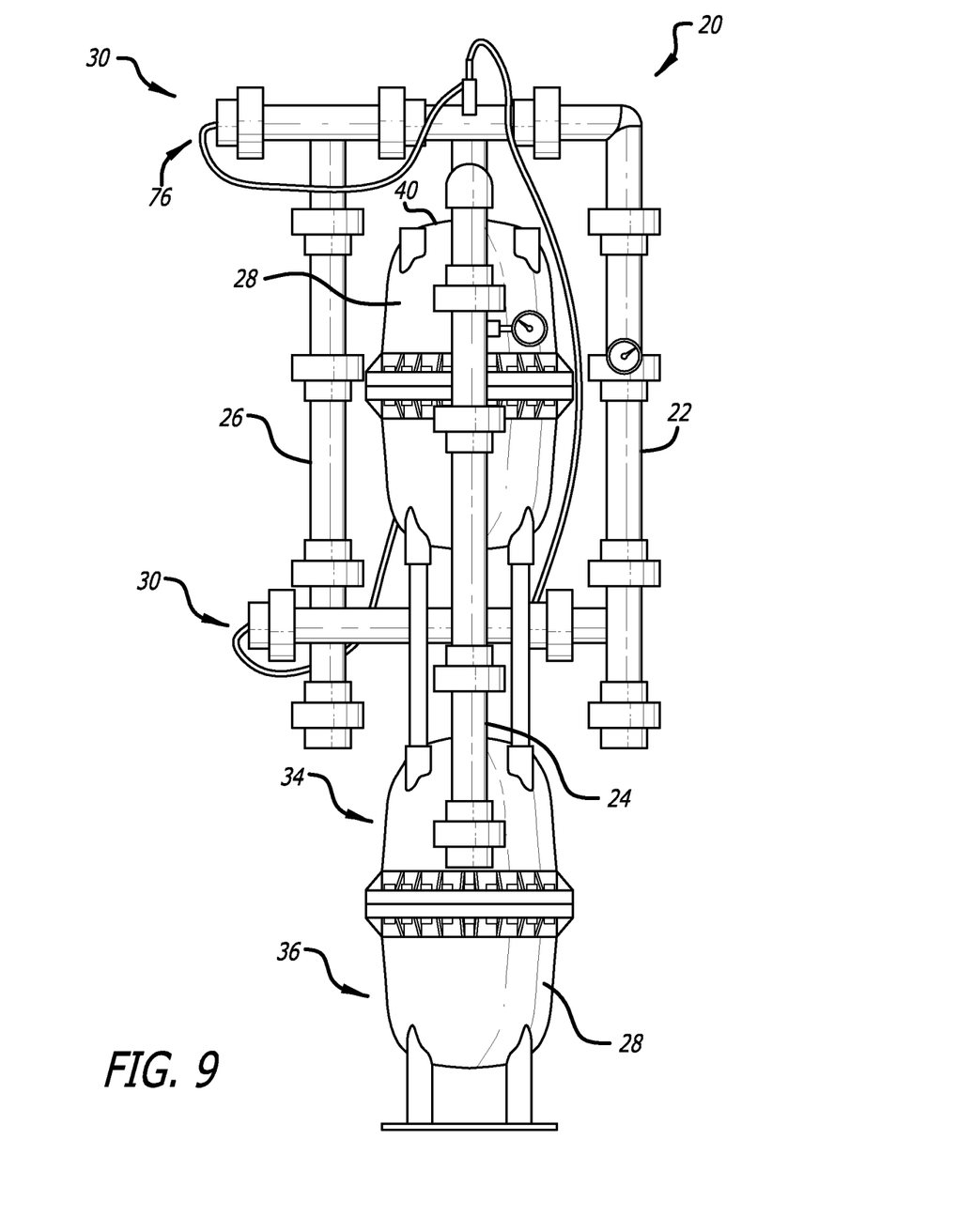
FIG. 9 is a schematic diagram of a two tank vertical configuration of the water filter system of the present invention.
Figure 10:
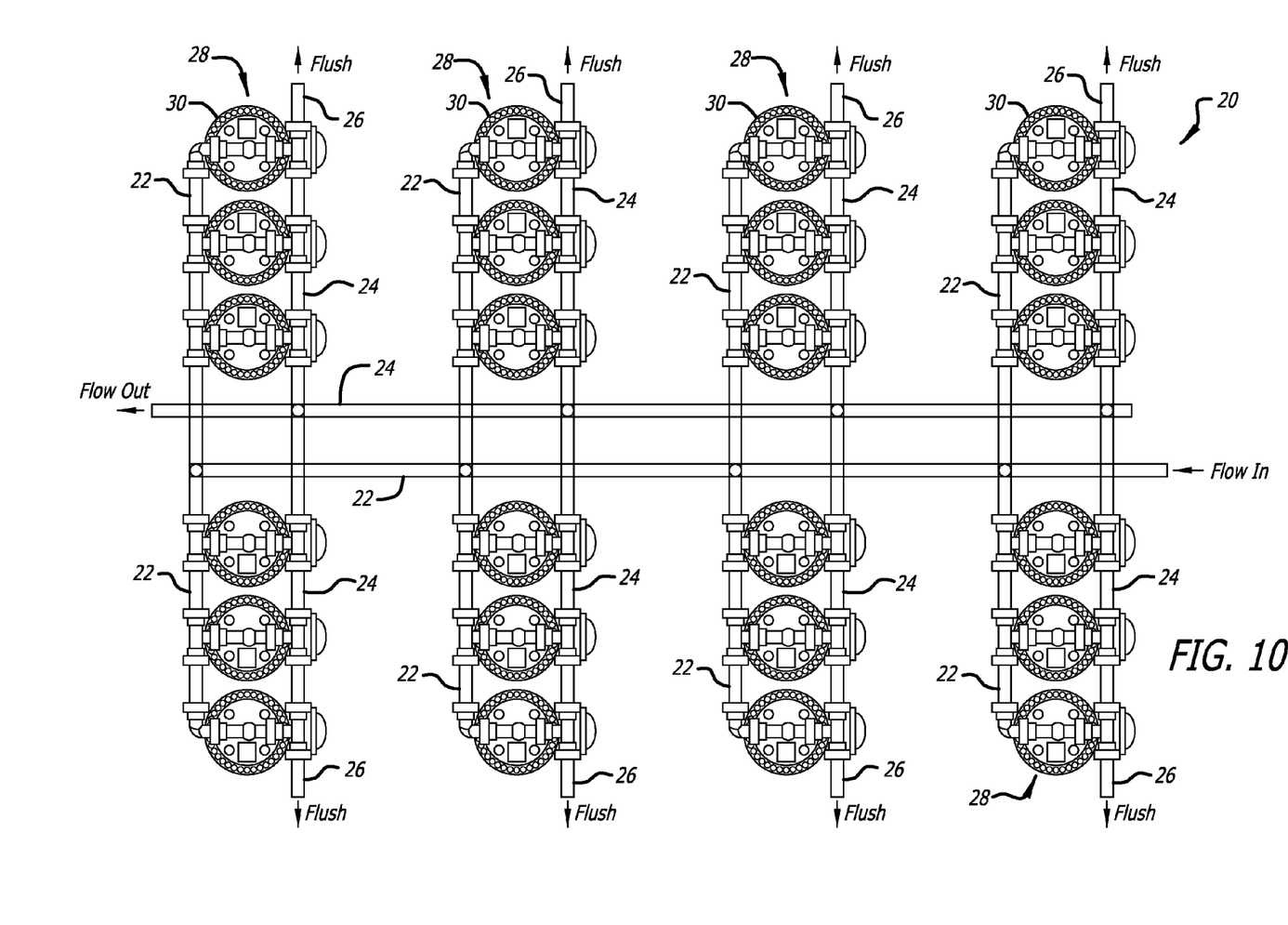
FIG. 10 is a schematic diagram of a portion of a typical 48 tank configuration of the water filter system of the present invention.

The controller is configured to generate a plurality of coded electrical signals corresponding to each of the plurality of back flush valves, respectively, with each of the plurality of coded signals indicating one of the first and second valve positions of the plurality of back flush valves, as will be further explained below. Each of the plurality of back flush valves can be operated manually or automatically by the controller, and is preferably a two wire back flush controller with two wires 66, 68 connected in parallel with each of the plurality of back flush valves. The controller typically includes a microprocessor having the capacity to control 96 or more filter stations, and includes a digital LED display 70, programming up/down arrow keys 72, and a programming control dial 74 with 10 positions for programming and running the filter stations, including the following positions: 1) for inputting the number of filters to be controlled, 2) for inputting the back flush time, 3 for inputting the dwell time, 4) for inputting the periodic flush time, 5) for setting the start of a manual flush cycle, 6) for selecting a programming number, 7) for entering a programming number, 8) for inputting the accumulated flush/time, 9) for turning the controller off, and 10) for setting the controller to run/auto. The flush valves can be operated manually or automatically by the controller. Automatic flushing is operated by the two wire back flush controller, thereby keeping the number of wires leaving the controller to the entire modular filter system to only two wires.

Each of the flush valves of the modular sand media filter tank is equipped with a receiver 76 and a solenoid switch 78. The receiver is "coded" to receive the "code" from the controller to operate the back flush valve to that particular tank. As more tanks are added to the system, no extra wires are needed to the controller, only continue the "two wire" cable to the added tanks. In larger systems, when an abundant amount of modular sand media filter tanks are used, flushing more than one tank at a time is an option. Typically up to three tanks can be operated from one back flush solenoid. The solenoids are typically plumbed individually with quarter inch tubing, for example. The design of the system eliminates all the plumbing and long runs typically found in other sand media filter systems, and has been found to be neat, clean and efficient.

Figure 16:
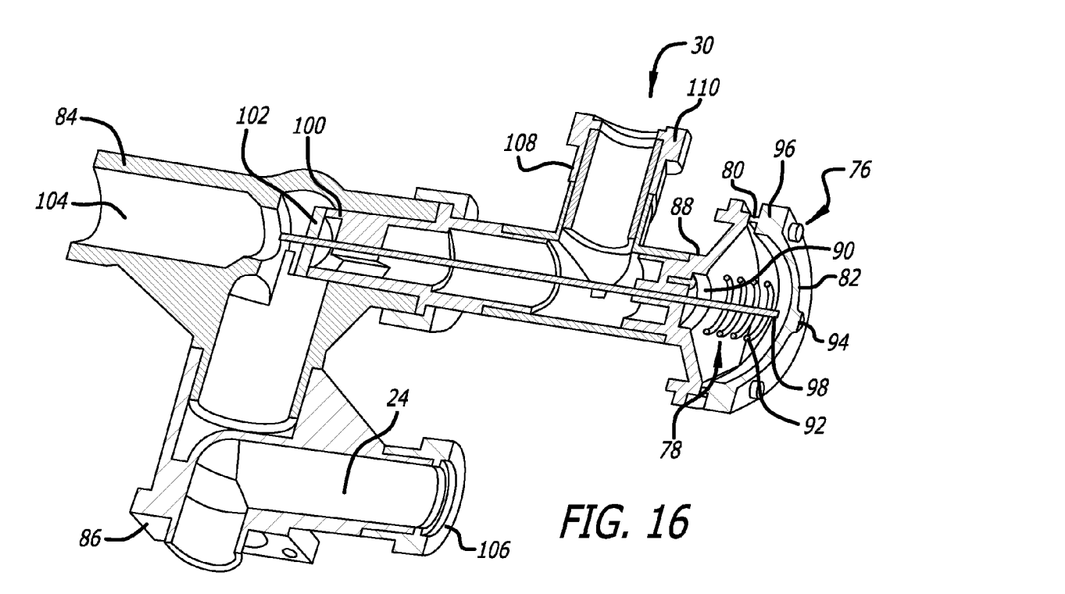
FIG. 16 is a cross-sectional view of a back flush valve of the water filter system of the present invention.

Referring to FIG. 16, each of the plurality of back flush valves is configured to move between a normal first valve position permitting normal flow from the one or more fluid supply flow conduits in a forward filtering direction through one or more of the plurality of media filter tank modules and out the one or more fluid outlet conduits, and a second valve position. The plurality of back flush valves back flush the corresponding one of the plurality of media filter tank modules, respectively, in the second valve position, permitting back flush flow from the one or more fluid supply flow conduits in a reverse, back flush direction, through one or more of the plurality of media filter tank modules and out the one or more fluid flush outlet conduits.

Each back flush valve includes a back flush lower body portion 80, a back flush upper body 82, a valve upper body 84 connected to a valve lower body 86 by a 1½ inch tee connector 88. The back flush lower body portion includes the receiver, and solenoid switch, and a back flush seat 90, a back flush spring 92, a back flush diaphragm 94, a diaphragm support 96, and a stainless steel rod 98 that is typically a quarter inch in diameter connected between the solenoid switch and the back flush upper body diaphragm seat 100, which seats against a seat retainer 102.

Each of the plurality of back flush valves includes an inlet port 104 connected in fluid communication with the one or more fluid supply flow conduits, an outlet port 106 connected in fluid communication with the one or more fluid outlet conduits, and a flush port 108 connected in fluid communication with the one or more fluid flush outlet conduits, with a union male thread 110. Each of the plurality of back flush valves associated with the plurality of media filter tank modules includes a receiver connected in electrical communication with the controller, and a corresponding solenoid switch electrically connected with the receiver, respectively, each the corresponding solenoid switch being operatively connected to one or more of the plurality of back flush valves and configured to move the corresponding one of the plurality of back flush valves between the first valve position and the second valve position responsive to the coded signals from the controller. The receiver is configured to receive the coded signal from the controller to operate the associated solenoid switch operatively connected to the one or more of the plurality of back flush valves.

It will be apparent from the foregoing that while particular forms of the invention have been illustrated and described, various modifications can be made without departing from the spirit and scope of the invention.

What is claimed is:

1. A water filter system, comprising:
   at least one fluid supply flow conduit;
   at least one fluid outlet conduit;
   at least one fluid flush outlet conduit;
   a plurality of interconnected media filter tank modules each having a bottom side and a top side with a top connector opening, each media filter tank module containing a particulate filter material, wherein each of said plurality of media filter tank modules includes an underdrain configured to be disposed within said plurality of media filter tank modules, at the bottom sides of said plurality of media filter tank modules, respectively, each said underdrain including an underdrain tee connector having at least one inlet flow port configured to be connected in fluid communication with said at least one fluid supply flow conduit, an outlet flow port connected in fluid communication with said at least one inlet flow port, and a plurality of assemblies, each assembly defining an outer periphery and including a plurality of fluid flow directing segments and a plurality of separator segments connected together with fasteners, each of said separator segments not allowing a fluid flow therethrough, each of said fluid flow directing segments of said plurality of fluid flow directing segments including an upwardly directed opening directed toward said module top side and connected in fluid communication with said at least one inlet flow port, each said assembly outer periphery exiting or receiving fluid flow only through said upwardly directed openings;
   a plurality of back flush valves associated with a corresponding one of said plurality of interconnected media filter tank modules, respectively, each of said plurality of back flush valves being connected to a corresponding top connector opening of one of said plurality of media filter tank modules, each of said plurality of back flush valves being movable between a closed valve position and an open valve position, said plurality of back flush valves back flushing said corresponding one of said plurality of interconnected media filter tank modules, respectively, in said open valve position, each of said plurality of back flush valves including an inlet port connected in fluid communication with said at least one fluid supply flow conduit, an outlet port connected in fluid communication with said at least one fluid outlet conduit, and a flush port connected in fluid communication with said at least one fluid flush outlet conduit; and
   a controller operatively connected to each of said plurality of back flush valves for controlling operation of said plurality of back flush valves, respectively.

2. The water filter system of claim 1, wherein each said underdrain is configured to back flush vertically on an upper side only.

3. The water filter system of claim 1, wherein each said underdrain is configured to only direct flow upwardly in said plurality of interconnected media filter tank modules during back flushing.

4. The water filter system of claim 1, wherein each said underdrain covers about 90% of the bottom of the media filter tank modules, respectively.

5. The water filter system of claim 1, wherein the particulate filter material comprises sand.

6. The water filter system of claim 1, wherein each media filter tank module comprises a media fill port on the top of the filter tank module for filling the filter module with particulate filter material.

7. The water filter system of claim 1, wherein each media filter tank module comprises a media drain port on the bottom of the filter tank module for draining and replacing the particulate filter material.

8. The water filter system of claim 1, wherein said controller is configured to generate a plurality of coded signals, each of said plurality of coded signals indicating one of said closed and open valve positions of said plurality of back flush valves, each of said plurality of back flush valves associated with said plurality of interconnected media filter tank modules including a receiver connected in electrical communication with said controller, and a corresponding solenoid switch electrically connected with said receiver, respectively, each said corresponding solenoid switch being operatively connected to at least one of said plurality of back flush valves and configured to move said corresponding one of said plurality of back flush valves between said closed valve position and said open valve position responsive to said coded signals from said controller.

9. The water filter system of claim 1, wherein said controller is configured to operate each of said plurality of back flush valves manually or automatically.

10. The water filter system of claim 1, wherein said controller comprises a two wire back flush controller.

11. A modular water filter system, comprising:
    at least one fluid supply flow conduit;
    at least one fluid outlet conduit;
    at least one fluid flush outlet conduit;
    a plurality of interconnected media filter tank modules each having a top side and a bottom side, and containing a particulate filter material, each media filter tank module having a top connector opening, and each media filter tank module including an underdrain configured to be disposed within said plurality of media filter tank modules, at the bottom sides of said plurality of media filter tank modules, respectively, each said underdrain including an underdrain tee connector having at least one inlet flow port configured to be connected in fluid communication with said at least one fluid supply flow conduit, an outlet flow port connected in fluid communication with said at least one inlet flow port, and a plurality of assemblies, each assembly defining an outer periphery and including a plurality of fluid flow directing plate segments and a plurality of separator plate segments connected together with fasteners, each of said separator segments not allowing a fluid flow therethrough, each of said fluid flow directing segments of said plurality of fluid flow directing segments including an upwardly directed opening directed toward said module top side and connected in fluid communication with said at least one inlet flow port, each said assembly outer periphery exiting or receiving fluid flow only through said upwardly directed openings;
    a plurality of back flush valves associated with a corresponding one of said plurality of interconnected media filter tank modules, respectively, each of said plurality of back flush valves being connected to a corresponding top connector opening of one of said plurality of media filter tank modules, each of said plurality of back flush valves being movable between a closed valve position and an open valve position, said plurality of back flush valves back flushing said corresponding one of said plurality of interconnected media filter tank modules, respectively, in said open valve position, each of said plurality of back flush valves including an inlet port connected in fluid communication with said at least one fluid supply flow conduit, an outlet port connected in fluid communication with said at least one fluid outlet conduit, and a flush port connected in fluid communication with said at least one fluid flush outlet conduit; and a controller configured to generate a plurality of coded signals for each of said plurality of back flush valves, respectively, each of said plurality of coded signals indicating one of said closed and open valve positions of said plurality of back flush valves, and each of said plurality of back flush valves associated with said plurality of interconnected media filter tank modules including a receiver connected in electrical communication with said controller, and a corresponding solenoid switch electrically connected with said receiver, respectively, each said corresponding solenoid switch being operatively connected to at least one of said plurality of back flush valves and configured to move said corresponding one of said plurality of back flush valves between said closed valve position and said open valve position responsive to said coded signals from said controller.

12. The modular water filter system of claim 11, wherein each said underdrain is configured to back flush vertically on an upper side only.

13. The modular water filter system of claim 11, wherein each said underdrain is configured to only direct flow upwardly in said plurality of interconnected media filter tank modules during back flushing.

14. The modular water filter system of claim 11, wherein the particulate filter material comprises sand.

15. The modular water filter system of claim 11, wherein each media filter tank module comprises a media fill port on the top of the filter tank module for filling the filter module with particulate filter material.

16. The modular water filter system of claim 11, wherein each media filter tank module comprises a media drain port on the bottom of the filter tank module for draining and replacing the particulate filter material.

17. The modular water filter system of claim 11, wherein said controller is configured to operate each of said plurality of back flush valves manually or automatically.

18. The modular water filter system of claim 11, wherein said controller comprises a two wire back flush controller.

* * * * *